Patented Jan. 18, 1949

2,459,442

UNITED STATES PATENT OFFICE 2,459,442

SEPARATION OF HYDROCARBONS

Moses Robert Lipkin, Philadelphia, Pa., assignor to Sun Oil Company, Philadelphia, Pa., a corporation of New Jersey No Drawing. Application December 5, 1945, Serial No. 633,037

4 Claims. (Cl. 260—677)

This invention relates to the separation of hydrocarbons according to chemical type by selective adsorption and particularly concerns the separation of unsaturated non-aromatic hydrocarbons from liquid hydrocarbon mixtures containing the same together with less adsorbable hydrocarbons. More specifically, the invention is directed to a cyclic process wherein such unsaturated hydrocarbons are removed from a liquid hydrocarbon mixture by adsorption on a granular adsorbent and wherein the used adsorbent is reactivated for reuse by desorbing the unsaturates by means of a liquid desorbing agent composed essentially of saturated hydrocarbons.

It is known that separation of hydrocarbons according to chemical type may be accomplished by means of adsorption and it is recognized that silica gel, or other adsorbents conforming substantially to silica gel in adsorptive properties, is especially useful for this purpose. Methods have been proposed heretofore wherein a liquid hydrocarbon mixture is treated with silica gel or a like adsorbent to selectively remove the more adsorbable hydrocarbons from the mixture. For example, this type of procedure has been applied for the separation of aromatics from composite hydrocarbon mixtures, since the aromatics in general are more highly adsorbable than non-aromatic hydrocarbons. It is also known that separations between non-aromatic hydrocarbons may be effected, due to the fact that adsorbents generally have a greater affinity for a relatively highly unsaturated hydrocarbon than for one which is relatively more saturated. Thus, an unsaturated hydrocarbon such as a mono-olefin, a diolefin or an acetylene may be preferentially adsorbed from saturated hydrocarbons, i. e. paraffins and naphthenes; or a relatively less saturated olefin such as a diolefin may be preferentially adsorbed from a relatively more saturated olefin such as a mono-olefin. Likewise, mixtures of relatively highly unsaturated hydrocarbons may be selectively adsorbed from one or more less unsaturated hydrocarbons.

Methods previously proposed for utilizing silica gel or like adsorbents for separating hydrocarbons have included a step wherein the adsorbed hydrocarbon material is recovered from the adsorbent by means of a desorbing agent which is much more adsorbable than the adsorbed hydrocarbon material and therefore readily capable of displacing it. As the desorbing agent in this step a polar material such as acetone, alcohol or ether has been used. The gel accordingly is left in an inactivated state due to the presence of the adsorbed polar agent, and therefore must be regenerated before it can be reused. The regeneration step usually entails steaming of the gel to displace the desorbing agent and then blowing the gel with air at a relatively high temperature to remove adsorbed water.

The difficulties arising in carrying out such procedures on a large scale have rendered the prior art methods impractical from a commercial standpoint, and consequently their use has been confined merely to laboratory analytical work. A major disadvantage results from the heating of the gel to effect regeneration and the subsequent cooling before reuse, since the large amount of gel needed for a commercial operation would require an unreasonable and altogether impractical length of time to effect the necessary heat transfer particularly when conventional equipment is employed. A further disadvantage arises due to the fact that the adsorbent after regeneration is in a dry condition. This results in a considerable liberation of heat when the adsorbent is used to treat further amounts of the liquid hydrocarbon charge due to the heat-of-wetting effect. Also, in some cases, the heating of the adsorbent may permanently impair its activity by partially destroying the porous structure of the adsorbent particles.

In my copending application Serial No. 501,280 filed September 14, 1943, now Patent No. 2,398,101 a process for separating aromatics from hydrocarbon mixtures which overcomes the above discussed difficulties is described and claimed. The present invention is directed to a process for separating unsaturated non-aromatic hydrocarbons from less adsorbable hydrocarbons which likewise overcomes the disadvantages of prior methods. The present process involves the further advantage that polymerization of the olefinic or other unsaturated non-aromatic hydrocarbons in the presence of the adsorbent is substantially eliminated, since the adsorbent normally is never in a dry condition and therefore heating of the unsaturated materials to polymerizing temperature upon contacting the hydrocarbons with dry adsorbent does not occur.

The process of this invention comprises a cyclic operation involving two alternate steps in each of which the adsorbent is contacted with a hydrocarbon liquid. The first is the adsorption step wherein the hydrocarbon charge is treated with silica gel or a substantially equivalent adsorbent to adsorb unsaturated material from relatively less unsaturated hydrocarbons. The second step accomplishes the desorption of the unsaturated material while simultaneously reactivating the adsorbent for reuse. This is achieved by using as the agent for displacing the unsaturates a hydrocarbon material which is less adsorbable than the unsaturates, rather than one for which the adsorbent has a greater affinity such as the polar agents previously proposed. Thus the desorbing agent may be essentially saturated hydrocarbon material such as normal paraffins, isoparaffins or naphthenes. I have found that the adsorbed unsaturates may be displaced by commercially feasible amounts of saturated hydrocarbon material and that the adsorbent will then be in sufficiently activated state for reuse in further separation of unsaturates. The process thus may be practiced at ambient temperature without heating and cooling steps and with substantially no heat-of-wetting effect, which latter advantage has been found to be particularly favorable in that, as above stated, it minimizes polymerization of the unsaturates.

In practicing the present process, hydrocarbon charge containing the unsaturate material which it is desired to concentrate is treated with silica gel or an adsorbent having similar adsorptive properties to adsorb the unsaturate material. Preferably both this step and the desorption step are carried out by percolating the charge through a bed of the gel. After sufficient charge has been passed into the gel bed, this step is discontinued and the liquid held within the interstices of the adsorbent may, if desired, be drained out, although this is not necessary as long as the subsequent step is conducted in a manner such that substantial mixing of desorbing agent and hold-up liquid does not occur. The desorbing agent is then percolated through the gel bed to displace the adsorbate. The desorbing agent may be any essentially saturated hydrocarbon liquid and generally will be selected so as to have a boiling point sufficiently different from that of the adsorbate to permit subsequent separation by distillation. A few examples of suitable desorbing agents are as follows: propane, butane, isobutane, pentane, isopentane, cyclopentane, hexane, cyclohexane, heptanes, octanes, etc., or mixtures of saturated hydrocarbons such as petroleum ether or alkylate. The desorption operation generally will not be continued until substantially all of the adsorbed unsaturates are displaced, since this may require an uneconomically large amount of desorbent, but usually will be stopped when the amount of unsaturates retained by the gel has reached a reasonably low value. An optimum throughput of desorbing agent may be determined for any given case by an economic balance correlating the various operating cost factors against yield and value of product. The charge material from which unsaturates have been removed and the solution of desorbed unsaturates in desorbing agent are collected as separate fractions. The refractive index of the efflux from the gel bed may be used as a convenient means of determining when to make the proper cut between fractions. After the desorption step has been completed, the adsorbent is then ready for reuse.

Cyclic operation in the manner above described may be carried out for a prolonged period with the adsorbent being maintained sufficiently active for satisfactory operation. In cases where the hydrocarbon charge may contain small amounts of polar substances, such as sulfur or nitrogen containing compounds or phenolic materials, the activity of the gel may gradually decline until further cyclic operation becomes uneconomic. In such cases the gel may be replaced or it may be subjected to a severe regeneration using a polar solvent such as methanol, followed by steaming and drying. Cyclic operation in the above manner may then be resumed.

The following examples illustrate specific embodiments of the invention:

Example I

A refinery fraction of $C_5$ hydrocarbons having a boiling range of about 80–105° F. and containing about 19% amylenes by volume was processed in a cyclic operation to separate the amylenes from the saturated $C_5$ hydrocarbons. A column of about 8 in. diameter filled with 28–200 mesh silica gel to a height of approximately 6 ft. was used. In each cycle of operation 6 gals. of the refinery $C_5$ fraction was percolated through the column and this was followed by 15 gals. of desorbing agent to displace the amylenes. The desorbing agent was an alkylate fraction composed mainly of isoparaffins boiling within the range of 200–330° F. The operation was carried through 22 cycles, during which the efflux stream from the column was cut at various points in order to determine how the purity of the recovered amylenes varied with the per cent recovery. The fractions obtained were distilled to remove the desorbed material from the desorbing agent.

It was found that when the efflux stream was cut to obtain an amylene fraction of 96% purity, this fraction contained 37% of the amylenes in the charge; that when the purity was 91%, the recovery was 56%; and that when the purity was 87%, the recovery was 61%. No substantial polymerization of the amylenes occurred.

Example II

This example illustrates how a diolefin may be concentrated from a mixture of a mono-olefin and a saturated hydrocarbon. A column of about 2 in. diameter packed to a height of 6½ ft. with 28–200 mesh silica gel was used. The charge consisted of (by volume) 13% isoprene, 13% pentene-1 and 74% saturated hydrocarbons which were mainly n-pentane and isopentane. The desorbing agent was the same as the alkylate used in Example I. In each of seven cycles of operation 3,500 ml. of the charge was percolated through the gel, followed by 3,400 ml. of the alkylate. The displaced adsorbate was distilled from the used alkylate. It was found that an isoprene concentrate having an isoprene content of 60% and containing 30% of the isoprene charged could be obtained. There was no evidence of appreciable polymerization of either the mono-olefin or di-olefin.

It will be understood that the above examples are merely illustrative and that the invention is useful in many other specific cases where it is desired to separate an unsaturated non-aromatic hydrocarbon from less adsorbable hydrocarbons. For example, the separation of other aliphatic mono-olefins or diolefins, or the separation of cyclic olefinic hydrocarbons, or the separation of acetylenic hydrocarbons, from less adsorbable hydrocarbons may be carried out in accordance with the invention. Also the adsorption of both aromatics and the unsaturated non-aromatics from the same hydrocarbon charge, followed by desorption of the adsorbed compounds and reactivation of the adsorbent by means of a saturated hydrocarbon liquid, may be practiced While silica gel is the preferred adsorbent, other adsorbents which conform substantially to silica gel in adsorptive properties may be utilized. These may include any activated clay or synthetic adsorbent which is sufficiently active to effect relatively good separations of the type described. Although in many cases activated carbon has adsorptive properties which are substantially different from silica gel, particularly when dealing with polar compounds, for the present purpose activated carbon is operable as the adsorbent and may be considered as substantially equivalent to silica gel.

Having described my invention what I claim and desire to protect by Letters Patent is:

1. A cyclic process for separating an unsaturate non-aromatic hydrocarbon from a hydrocarbon mixture containing the same together with at least one saturate hydrocarbon which comprises treating said mixture in liquid phase with silica gel to preferentially adsorb said unsaturate hydrocarbon therefrom and to yield a liquid of higher saturate content, then washing the used adsorbent, at ordinary temperature and without heating, with an essentially saturate hydrocarbon liquid other than said liquid of higher saturate content, in sufficient amount to substantially desorb the unsaturate hydrocarbon and to simultaneously reactivate the adsorbent for re-use, said essentially saturate hydrocarbon liquid being the sole desorbing agent employed, withdrawing from the adsorbent a liquid mixture of desorbing agent and unsaturate hydrocarbon, and then, while the adsorbent is still wet with desorbing agent, directly re-using the adsorbent for further separation of unsaturate hydrocarbon in the manner specified.

2. A process according to claim 1 wherein said unsaturate hydrocarbon is an olefin.

3. A cyclic process for separating an unsaturate non-aromatic hydrocarbon from a hydrocarbon mixture containing the same together with at least one saturate hydrocarbon which comprises percolating said mixture in liquid phase through silica gel to preferentially adsorb said unsaturate hydrocarbon therefrom and to yield a liquid of higher saturate content, then percolating through the used adsorbent, at ordinary temperature and without heating, an essentially saturate hydrocarbon liquid other than said liquid of higher saturate content, in sufficient amount to substantially desorb the unsaturate hydrocarbon and to simultaneously reactivate the adsorbent for re-use, said essentially saturate hydrocarbon liquid being the sole desorbing agent employed, withdrawing from the adsorbent a liquid mixture of desorbing agent and unsaturate hydrocarbon, and then, while the adsorbent is still wet with desorbing agent, directly re-using the adsorbent for further separation of unsaturate hydrocarbon in the manner specified.

4. A process according to claim 3 wherein said unsaturate hydrocarbon is an olefin.

MOSES ROBERT LIPKIN.

REFERENCES CITED

The following references are of record in the file of this patent:

UNITED STATES PATENTS

| Number | Name | Date |
|---|---|---|
| 2,384,311 | Kearby | Sept. 4, 1945 |
| 2,390,536 | Houdry et al. | Dec. 11, 1945 |
| 2,395,491 | Mavity | Feb. 26, 1946 |